(12) United States Patent
Raz et al.

(10) Patent No.: US 6,406,000 B1
(45) Date of Patent: Jun. 18, 2002

(54) LOAD-SECURING DEVICE

(75) Inventors: Dan Raz, Haifa; Michael Goldstein, Bat-Yam, both of (IL)

(73) Assignee: Mag-Eh, Ltd., Mobile Post Ein Hashofet (IL)

( * ) Notice: Subject to any disclaimer, the term of this patent is extended or adjusted under 35 U.S.C. 154(b) by 0 days.

(21) Appl. No.: 09/614,263

(22) Filed: Jul. 12, 2000

(30) Foreign Application Priority Data

Jul. 15, 1999 (IL) ............................................. 130.974

(51) Int. Cl.$^7$ ................................................ B66D 1/00
(52) U.S. Cl. .................... 254/323; 414/466; 224/42.23; 224/42.24
(58) Field of Search .................... 254/323; 414/463, 414/466; 224/42.12, 42.23, 42.24

(56) References Cited

U.S. PATENT DOCUMENTS

| | | | | |
|---|---|---|---|---|
| 4,884,785 A | * | 12/1989 | Denman et al. | 254/323 |
| 5,975,498 A | * | 11/1999 | Sauner | 254/323 |
| 6,079,932 A | * | 6/2000 | Boucher | 414/463 |
| 6,092,790 A | * | 7/2000 | Dobmeier et al. | 254/323 |
| 6,142,449 A | * | 11/2000 | Aldridge et al. | 254/323 |
| 6,269,546 B1 | * | 7/2001 | Oxyer et al. | 254/323 |

* cited by examiner

*Primary Examiner*—Emmanuel M. Marcelo
(74) *Attorney, Agent, or Firm*—Brown, Martin, Haller & McClain, LLP (57) ABSTRACT

The invention provides a device for securing the upper terminal position of a liftable and lowerable object, comprising cable means having a hoist-side end and an object-side end; a stationary bracket having an aperture disposed in a substantially horizontal plane; a housing supported by the object-side end of the cable means and carrying the object, the housing having a lower portion and an upper portion, at least the upper portion being configured to pass through the aperture, a first opening at the top of the upper portion and a second opening at the bottom of the lower portion facilitating the passage of the cable means through the housing, and two oppositely located, elongated slots extending along at least parts of the upper portion; lever means located inside, and extending through a substantial portion of, the housing, the lever means being pivotably mounted in the lower portion of the housing and being provided with catch means and camming means, the lever means having a first limit position in which the camming means protrudes through one of the elongated slots, and a second limit position in which said catch means protrudes through the other one of the elongated slots, and spring means adapted to act on the lever means and biasing the lever means towards the second limit position.

11 Claims, 14 Drawing Sheets

LOAD-SECURING DEVICE

FIELD OF THE INVENTION

The present invention relates to a device for securing the upper terminal position of a lowerable and liftable object, in particular, a spare tire for a vehicle.

BACKGROUND OF THE INVENTION

Spare tires for vehicles are mostly heavy and bulky objects that, in many vehicles, are accommodated below the vehicle body and are secured against the bottom of the vehicle or against a structure carried by elements of the vehicle chassis. Because of their weight and size, vehicle spare tires can rarely be lowered to the ground, nor raised for storage, by hand. For this reason, heavier vehicles are provided with hoisting devices such as winches, by means of which the spare tire is lowered or raised using a steel cable.

Steel cables, however, are liable to snap or break due to a number of causes, all of which are relevant to their use for the above-mentioned purpose: lack of maintenance, corrosion due to exposure to the environment, fatigue due to vibration-enhanced stresses, and the like. A hoisting cable failure could cause the spare tire to break loose from its anchorage; should this happen in mid-travel, it would seriously endanger not only the vehicle itself, but even more so, other road users behind or alongside it.

A safety device to prevent such accidents is known from U.S. Pat. No. 4,254,939, which provides a device consisting of two hollow uprights, in each of which travels a cable-operated carriage supporting the load to be raised or lowered. In case of cable failure, springs activate a system of levers, causing a roller to be wedged into a tapering gap between the body of each carriage and an inside wall of the uprights. The braking force produced is thus purely frictional.

SUMMARY OF THE INVENTION

It is therefore one of the objects of the present invention to provide a device that, in case of cable failure, will prevent the detachment of a load from its point of anchorage by positive action, rather than reliance on friction.

It is a further object of the present invention to ensure that the load is automatically secured once it is raised to its upper position of rest and that it is automatically released from its secured state upon its being controlledly lowered from that position.

According to the invention, the above object is achieved by providing a device for securing the upper terminal position of a liftable and lowerable object, comprising cable means having a hoist-side end and an object-side end; a stationary bracket having an aperture disposed in a substantially horizontal plane; a housing supported by said object-side end of said cable means and carrying said object, said housing having a lower portion and an upper portion, at least the upper portion being configured to pass through said aperture, a first opening at the top of the upper portion and a second opening at the bottom of the lower portion facilitating the passage of said cable means through said housing, and two oppositely located, elongated slots extending along at least parts of said upper portion; lever means located inside, and extending through a substantial portion of, said housing, said lever means being pivotably mounted in the lower portion of said housing and being provided with catch means and camming means, said lever means having a first limit position in which said camming means protrudes through one of said elongated slots, and a second limit position in which said catch means protrudes through the other one of said elongated slots, and spring means adapted to act on said lever means and biasing said lever means towards said second limit position.

The invention further provides a device for securing the upper terminal position of a liftable and lowerable object, comprising cable means having a hoist-side end and an object-side end; a stationary bracket having a rear wall and two lateral walls and provided with bearing means; lever means located between the two lateral walls of said bracket and provided in its upper portion with journals whereby said lever means is pivotably mounted in the bearing means of said bracket and can assume first and second limit positions of tilt, said lever means being provided with gripper means at its lower end; plunger means carrying said object and kinematically connected to said cable means, said plunger means having a central bore through which said cable means passes, and first spring means attached to said stationary bracket and biasing said lever means towards the second limit position; wherein, in the first limit position of said lever means, tension in the cable means causes the lever means to tilt towards the bracket rear wall, thereby permitting said plunger means to enter a space defined by said lever means and said rear wall, thus forcing said lever means into the second limit position with the gripper means of the lever being located substantially vertically below the head of said plunger means, whereby, in case of cable failure, said first spring means forces the lever means into the second limit position and the plunger head is intercepted and retained by said gripper means.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
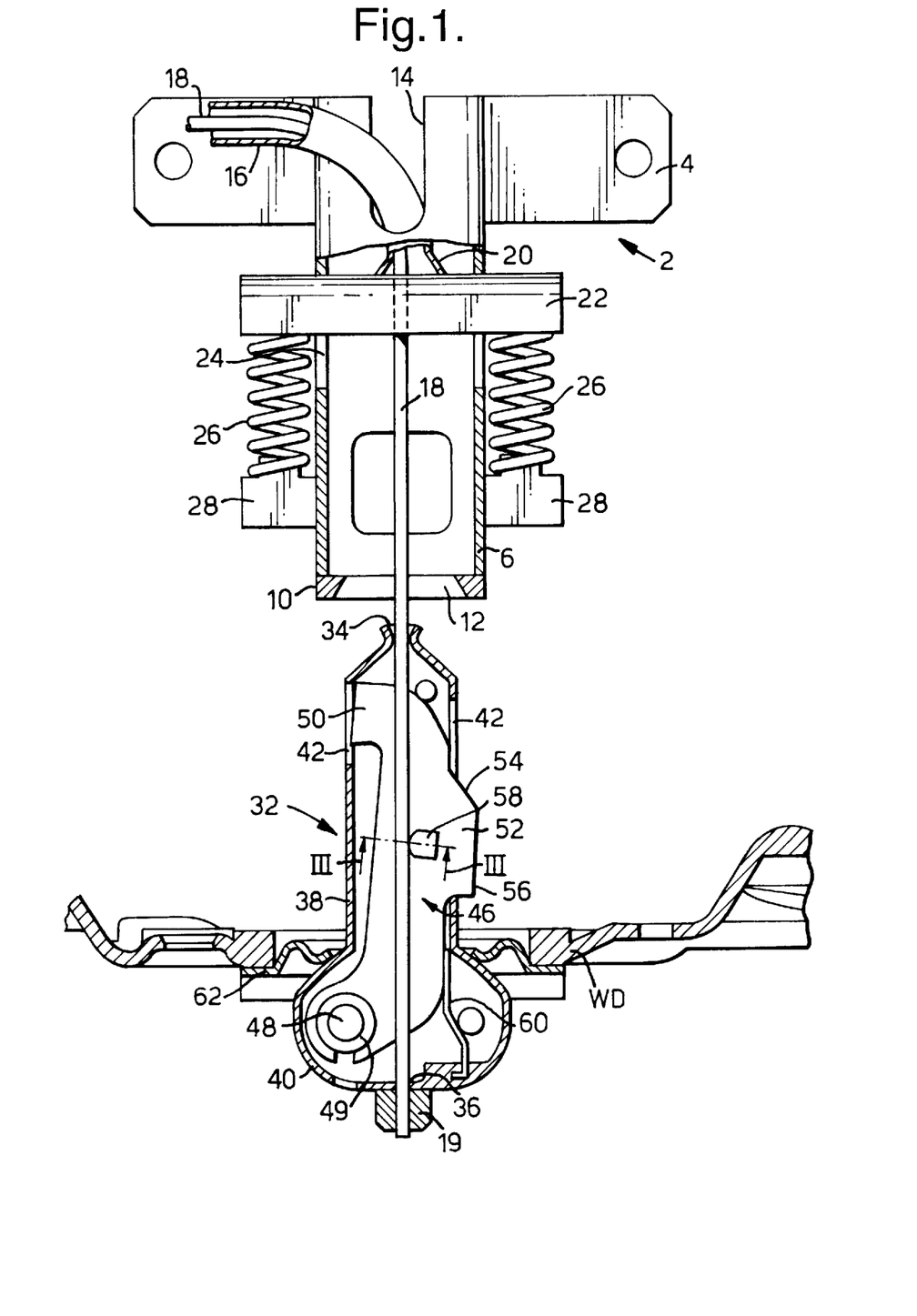
FIG. 1 is a cross-sectional view of a first embodiment of the device according to the present invention, in a first stage of its operation.
Figure 2:
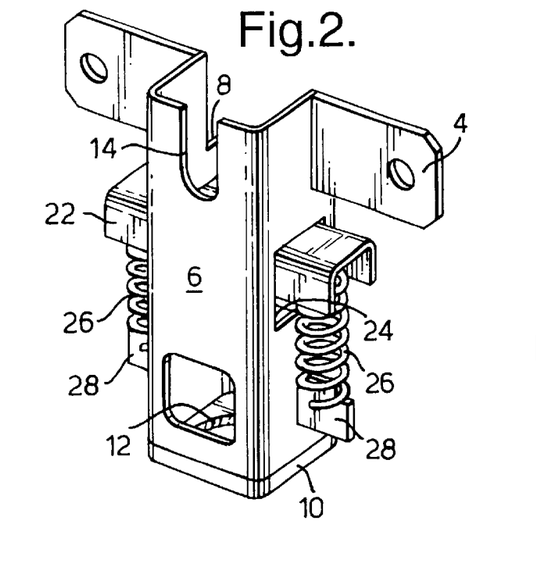
FIG. 2 is a perspective view of the bracket of the device according to the invention.

Referring now to the drawings, there is shown in FIG. 1 a first, preferred embodiment of the invention in a first stage of its operation, in which a load is being raised or lowered. Seen is a bracket 2, shown to better advantage in FIG. 2, which is fixedly attached to a member of the vehicle's chassis with the aid of lugs 4, advantageously welded to a tubular body 6 of a substantially square cross-section. A cutout 8 (FIG. 2) makes room for the above-mentioned chassis member. A plate 10 with a downardly flaring aperture 12 is fixedly attached to the end of body 6. The wall portion opposite cutout 8 is provided with a vertical slot 14, through which is introduced the bend end of a guide tube 16 accommodating a steel cable 18 coming from a hoisting device (not shown) and ending in a ferrule 19. Guide tube 16 has a flaring end 20 which rests against a crossbeam 22 of an inverted U-shaped cross-section traversing body 6 via a pair of window-like openings 24 in the side walls of body 6. The height of openings 24 is much larger than the thickness of crossbeam 22, which, in this operational stage, and depending on the weight of the load, is held up against, or at a position close to, the upper limits of openings 24 by means of two helical compression springs 26, the lower ends of which abut against and are held in position by two lugs 28 fixedly attached to the side walls of body 6. The full purpose of springs 26 will be discussed further below.

Cable 18 is the load-carrying member of the device, with the load being represented by the wheel disk WD of a spare tire. On its way down from guide tube 16, cable 18 passes through the aperture 12, enters a split housing 32 (of which only one half is shown) via a first opening 34, and leaves it via a second opening 36.

Figure 4:
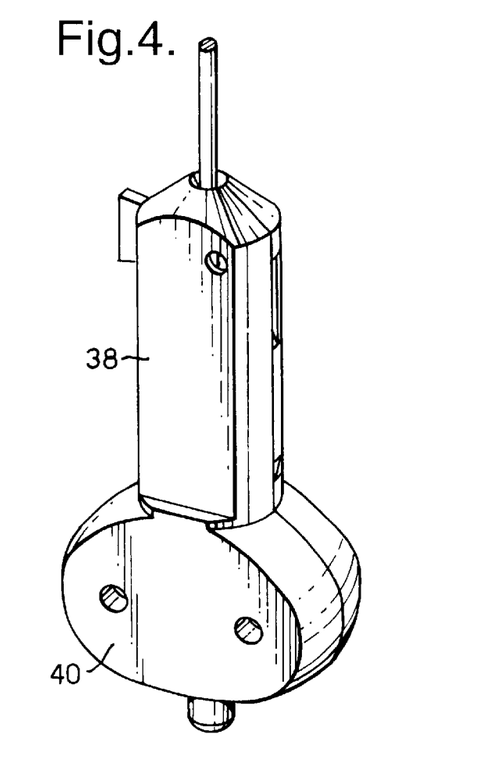
FIG. 4 is a perspective view of the assembled housing of the device.

Housing 32 is a split housing held together in assembly by bolts (not shown), and is seen in perspective in FIG. 4.

Figure 5:
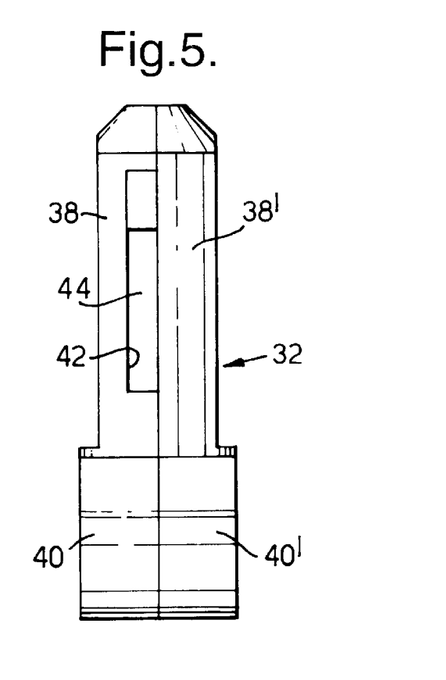
FIG. 5 is a side view of the housing of the device.

Housing 32 has a bottle-like shape, with an upper, neck-like portion 38 and a lower, bulbous portion 40 flattened on both sides (FIGS. 4, 5). Part of upper portion 38 is provided with recesses 42, which, in conjunction with the second half of split housing 16, form window-like slots 44, the purpose of which will become apparent further below.

A side view of the (empty) split housing 32 is shown in FIG. 5, from which it is seen that the two halves of split housing 32 are not fully identical: recesses 42 are formed only in the left housing half, and the window-like slots 44, formed when the two housing halves are put together, are therefore not in the central plane of housing 32.

Inside housing 32 there is seen a lever 46 pivotable at its lower end about a pivot 48 seated inside a hub 49 and extending through a substantial portion of housing 32. Lever 46, advantageously made of flat steel, is provided on one of its edges with a nose-like catch 50, and on the other one of its edges, with a camming projection 52 having camming surfaces 54 and 56. Lever 46 can assume two limit positions of tilt: a first position in which camming projection 52 protrudes from housing 32 as is seen in FIG. 1, and a second position in which catch 50 protrudes.

Figure 3:
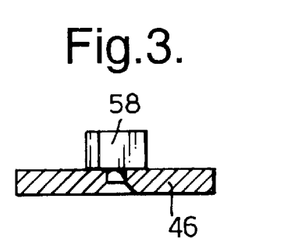
FIG. 3 is a view in cross-section along plane III—III of FIG. 1.

Further seen is a projection 58 provided in the middle portion of lever 46, the shape of which is seen to better advantage in FIG. 3. As shown in FIG. 1, cable 18, merely touching the surface of lever 46, contacts projection 58 and, because of its tension, maintains lever 46 in the above-mentioned first position in which camming projection 52 protrudes from housing 32 against the biasing force of a flat spring 60.

Wheel disk WD is supported by a wheel retainer 62, configured to be slipped through the wheel disk bore and become located below wheel disk WD. The entire load rests on ferrule 19.

Figure 6:
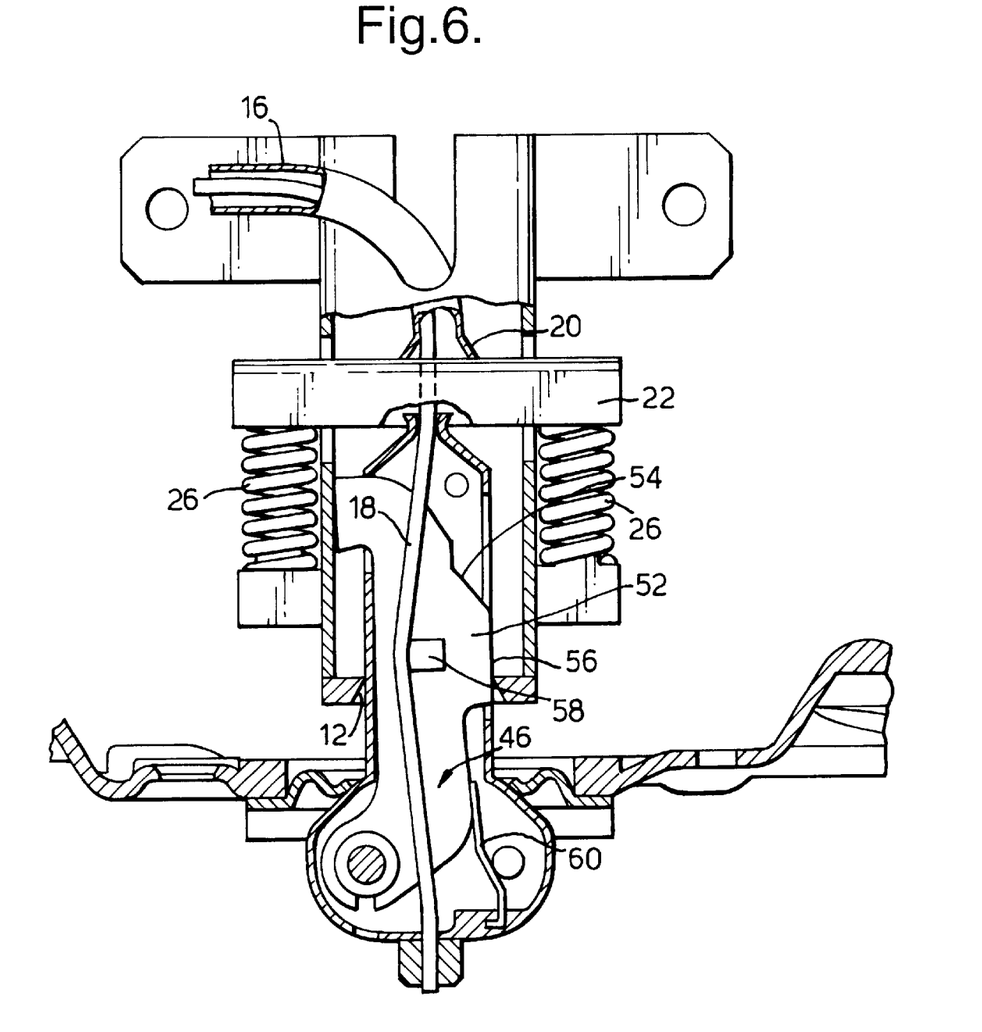
FIG. 6 depicts the device in a second stage of its operation.

The next operational stage is represented in FIG. 6. Here, the device is shown in its uppermost, secured position, with the tire fully raised and abutting against the supporting structure. On its way up from the position illustrated in FIG. 1, the slanted camming surface 54 has encountered the flaring surface of aperture 12, due to which lever 46 has been forced into the second limit position, in which catch 50 now protrudes from housing 32. Any further movement upwards stabilizes that position when the vertical camming surface 56 contacts the rim of aperture 12. At the same time, projection 58 is forcibly deflecting cable 18 from the straight line it followed in FIG. 1, putting it under additional tension and making sure that the next time the spare tire is lowered, cable 18, overcoming spring 60, will act to return lever 46 to the first limit position as soon as camming surfaces 54,56 have passed below the rim of aperture 12.

It is also seen that springs 26 are almost fully compressed. This is achieved by operating the hoisting device beyond the point when the raised tire has made contact with the vehicle bottom or the structure against which it is to be secured. This produces additional tension in cable 18, which, acting on the bent end portion of guide tube 16, flexes the relatively long guide tube downwards, causing its flared end 20 to exert pressure on crossbeam 22, to compress springs 26. The energy thus stored in springs 26 is used to compensate for a possible reduction of tire width due to loss of air, ensuring that friction between the tire and the abutment structure will always remain sufficiently high to prevent a tire from working itself loose.

Figure 7:
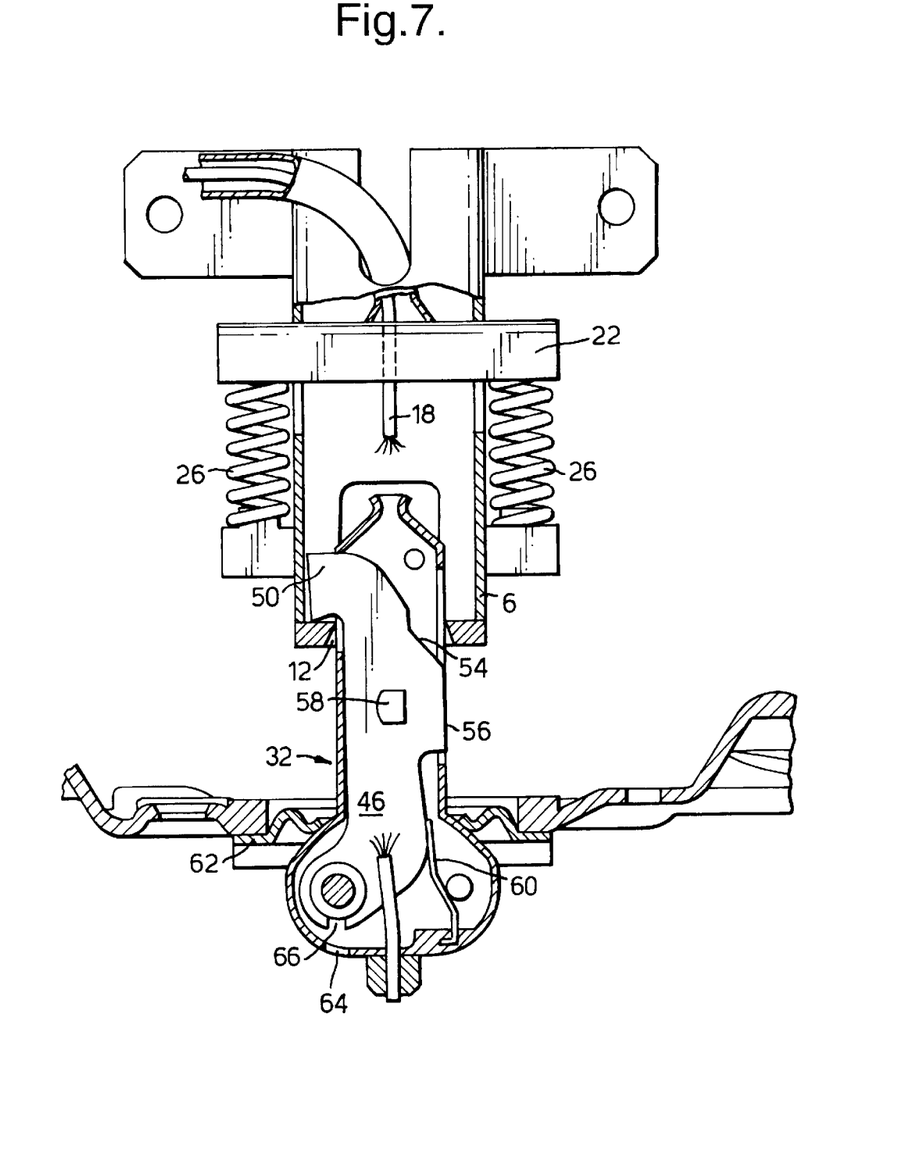
FIG. 7 represents the situation following a cable failure.

A situation of cable failure or break is depicted in FIG. 7. From the instant camming surfaces 54, 56 have passed beyond aperture 12, lever 46 is maintained in the second limit position by spring 60, which is no longer opposed by the broken cable 18, and catch 50 is thus intercepted by the rim of aperture 12, which, of course, breaks the fall.

While in the event of cable rupture the spare tire remains safely secured to the vehicle, removal of the tire for repair of the hoisting device can only be carried out in service stations equipped with means to raise the tire high enough to detach wheel retainer 62 from wheel disk WD. Housing 32 can then easily be removed from bracket tube 6 by inserting a tool such as a screw driver into a hole 64 in housing 32 and apply it laterally against a notch 66 in lever 46, thereby rotating lever 64 in the clockwise sense, until catch 50 becomes disengaged from the rim of aperture 12, at which instant housing 32 can be removed from bracket tube 6.

Figure 8:
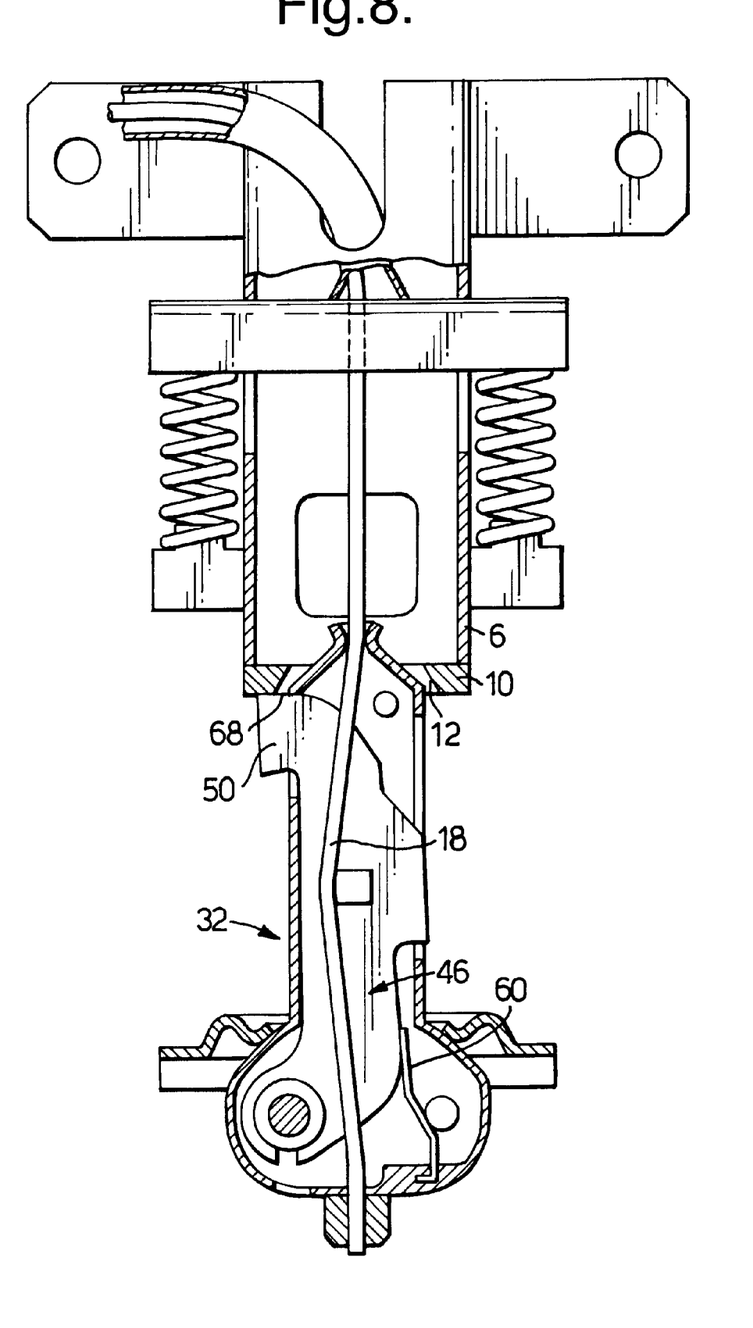
FIG. 8 shows the device being pulled up without the load.

FIG. 8 illustrates a situation in which housing 32 is pulled up without the tire and shows how it is prevented from entering bracket tube 6 and getting caught by the rim of aperture 12. Raising load-free housing 32, cable 18 is practically without tension, permitting flat spring 60 to force lever 46 into the second position, in which catch 50 protrudes from housing 32. When housing 32 now approaches bracket tube 6, upper surface 68 of catch 50 will be stopped by the lower surface of plate 10, preventing housing 32 from advancing any further.

Figure 9:
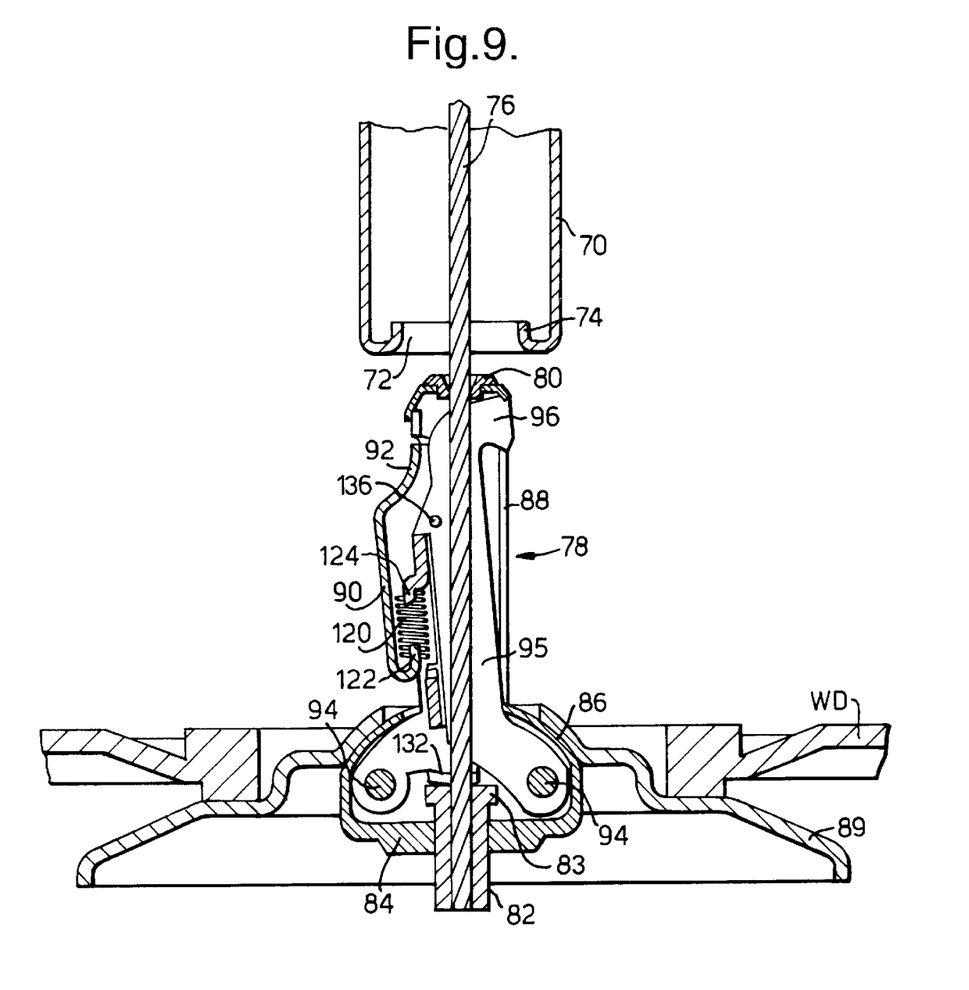
FIG. 9 is a cross-sectional view of a second embodiment of the device according to the invention, in a first stage of its operation.

FIG. 9 shows a second embodiment of the invention in a first stage of its operation, in which a load is being raised or lowered. Seen is the tubular end 70 of a bracket (not shown), which is fixedly attached to a member of a vehicle's chassis and the end of which is provided with a circular opening 72 provided with a re-entrant rim 74.

Cable 76 is the load-carrying member of the device, with the load being represented by the wheel disk WD. On its way down from the hoisting device (not shown), cable 76 passes through circular opening 72 and enters a two-part housing 78 via a bushing 80 and ends in a headed ferrule 82, to which it is fixedly attached. Ferrule 82, having a head 83, is slidingly seated in the lower part 84 of two-part housing 78. The suitably shaped shoulders 86 of upper housing part 88 carry wheel retainer 89, similar in design to that shown in FIG. 1.

Figure 10:
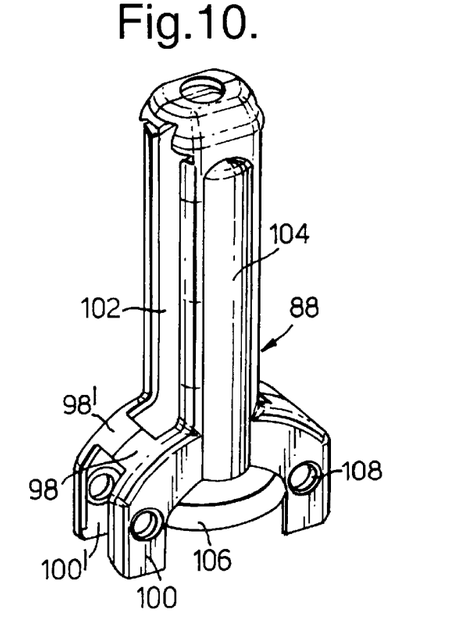
FIG. 10 is a perspective view of the upper part of the housing of the device.
Figure 11:
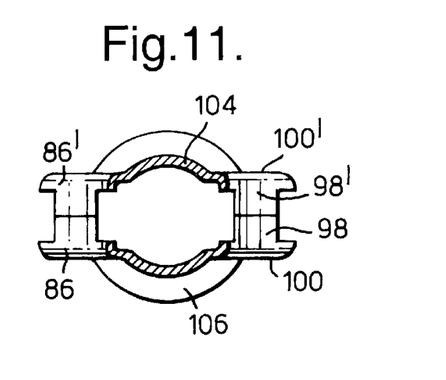
FIG. 11 is a top view of the upper housing part in cross-section at about the middle of its height.
Figure 12:
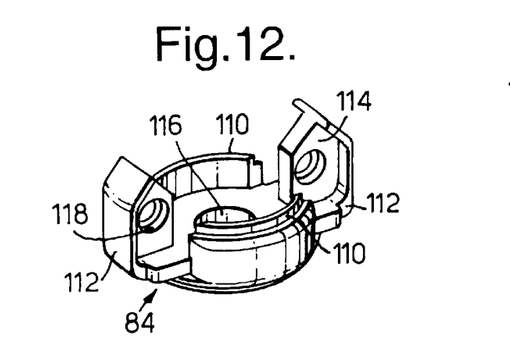
FIG. 12 is a perspective view of the lower housing part.

Two-part housing 78 is seen to better effect in FIGS. 10, 11 (upper part 88) and FIG. 12 (lower part 84). Upper housing part 88 is advantageously made of a press-formed sheet metal stamping, rigidified by bulges 104, that is folded onto itself, until tabs 98, 98', which are parts of the forked ends 100, 100', meet, thereby defining the central plane of housing part 88. The folding operation produces two oppositely located, elongated, window-like slots 102, of which only one is seen in FIG. 10. The function of these slots will be explained further below. Also seen are holes 108, designed to accommodate pivots 94 (FIG. 9). FIG. 11 is a top view of housing part 88 in cross section, at about the middle of its height.

FIG. 12 shows the lower part 84 of housing 78. Rims 110 fit the inside diameter of skirts 106 of FIG. 10 and posts 112 fit the gaps between fork-like ends 100, 100'. Recesses 114 in posts 112 are filled by the respective ends of a lever system to be discussed presently. A central hole 116 accommodates ferrule 82 of FIG. 9. In the assembled housing 78, holes 118 are obviously aligned with holes 108 of upper housing part 88.

Figure 13:
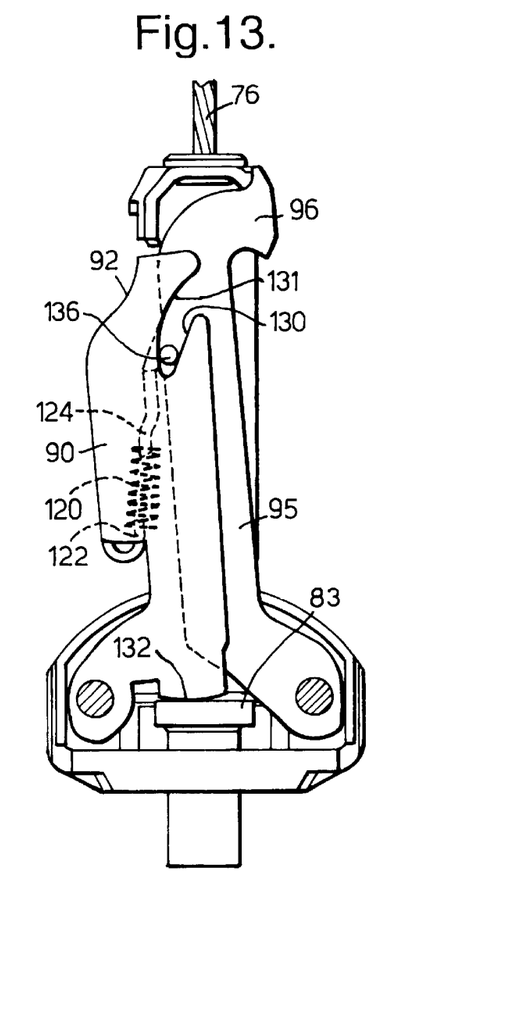
FIG. 13 shows the nested levers at a larger scale.

The central element of this embodiment of the device is a nested twin-lever system pivotably mounted in housing 78. The system comprises a camming lever 90 having a camming surface 92 and a catching lever 94 provided with a nose-like catch 96. Both levers have a substantially U-shaped profile, with the profile of camming lever 90 being wide enough for catching lever 95 to be nestable therein, as seen in FIG. 13.

The twin-lever system further includes a helical compression spring 120, one end of which is seated on a tongue-like projection 122 raised from camming lever 90, and the other end of which is seated on a similar projection 124 raised from catching lever 95. In the stage of operation shown in FIG. 9, in which the spare tire is either raised or lowered, camming lever 90 fully projects from housing 78 and catching lever 88 is fully pulled inside housing 78, with spring 120 compressed.

The mechanics of the interaction of the various components will be discussed further below.

Figure 14:
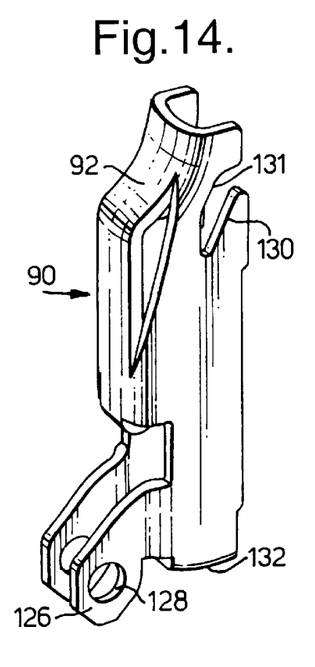
FIG. 14 is a perspective view of the camming lever.

FIG. 14 is a perspective view of camming lever 90. The substantially U-shaped profile is clearly seen, except for two wing-like projections 126 which are configured to fit recesses 114 in posts 112 of lower housing part 89 (FIG. 12). Holes 128 are obviously meant to fit pivots 94 (FIG. 9). Further seen are pairs of second and third inclined camming surfaces 130, 131, the purposes of which will become apparent further below.

Figure 15:
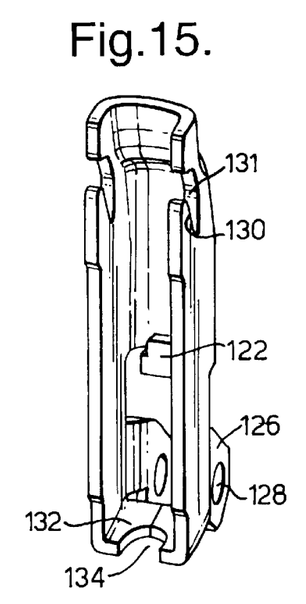
FIG. 15 provides an inside view of the camming lever.

FIG. 15 provides an inside view of camming lever 90, showing tongue-like projection 122 on which is seated spring 120 (FIG. 9). Also clearly seen is heel 132 which, as will be shown, has an important function in the mechanics of the device. Cut-out 134 provides a free passage to cable 76. When cable 76 is under load, heel 132 is always in contact with head 83 of ferrule 82.

Figure 16:
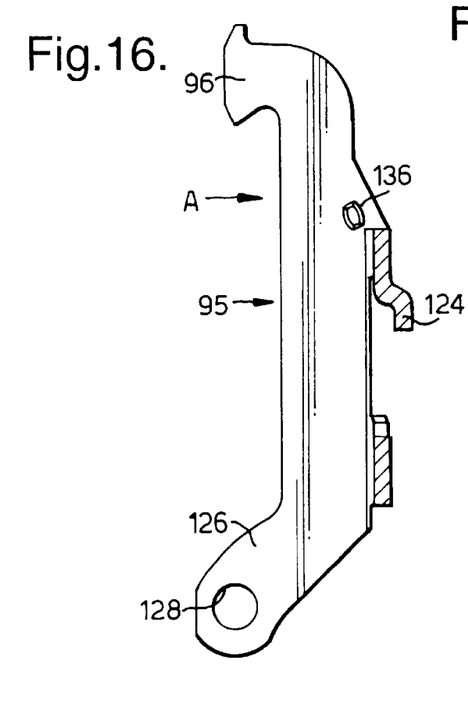
FIG. 16 is an elevational view of the catching lever.

FIG. 16 is an elevational view of catching lever 95, showing catch 96 and projection 124 on which is seated the other end of spring 120. Also seen is one of a pair of pin-like cam followers 136 which, in the assembled, i.e., nested, twin-lever system, ride on the inclined surfaces 130 of camming lever 90, thereby being withdrawn into housing 78 against the resilient force of spring 120.

Figure 17:
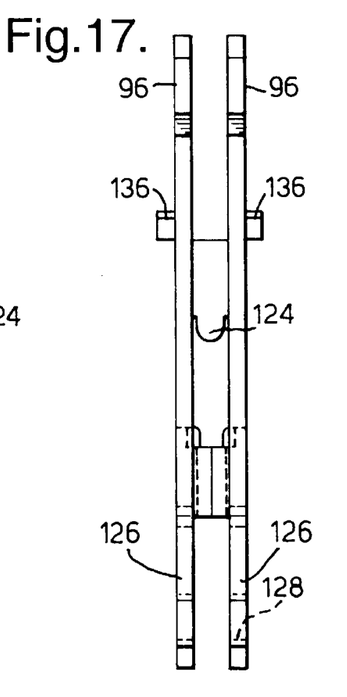
FIG. 17 shows the catching lever as seen in the direction of arrow A in FIG. 16.

FIG. 17 shows catch lever 95 as seen in the direction of arrow A in FIG. 16. Seen is the pair of cam followers 136, advantageously extruded from the material of the blank prior to its being folded to produce the U-shaped profile, and the tongue-like projection 124 serving as a seat for compression spring 120.

Figure 18:
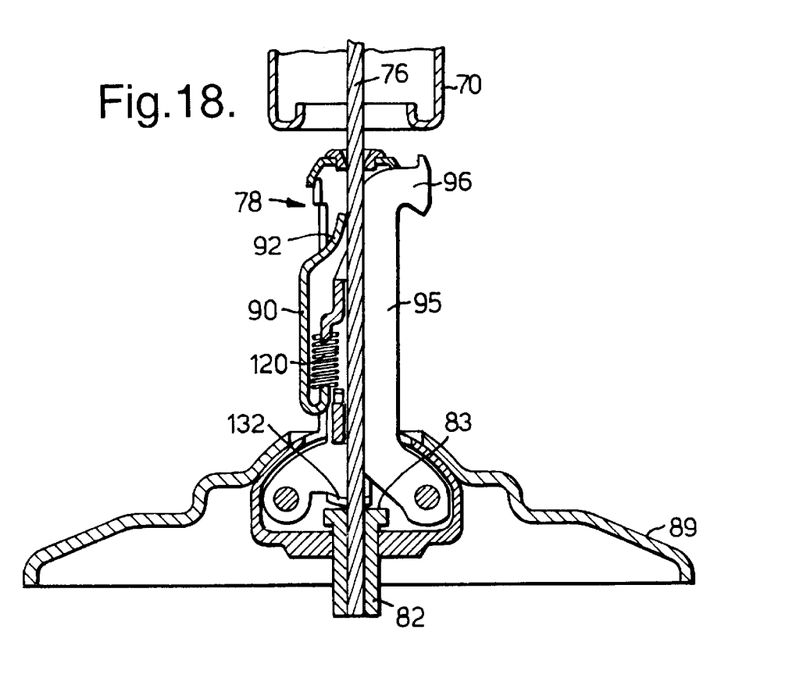
FIG. 18 represents the device according to the invention in the non-loaded state.

The following is a brief description of the different operational stages of this embodiment. FIG. 18 represents the non-loaded device. As no weight is acting on wheel retainer 89 and, consequently, no force is acting on housing 78, heel 132, which controls the position of camming lever 90 relative to housing 78, is not acted upon by head 83 of cable ferrule 82, thus permitting compression spring 120 to tilt catching lever 95 in the clockwise sense, so that catch 96 will project from housing 78, while camming surface 92 is now largely inside housing 78. This is one of the limit positions of the lever system. It will be appreciated that this arrangement also precludes the possibility of the non-loaded device being accidentally hoisted up into bracket 70, as the projecting catch 96 will prevent the device from entering opening 72.

The first stage of hoisting up a spare tire is illustrated in FIG. 9. When the tire is mounted on wheel disk WD and the hoist lifts the tire off the ground, the full weight of the tire acts on housing 78, producing a reactive force exerted by head 83 of cable ferrule 82 on heel 132. This in turn produces a moment about pivot 94 of camming lever 90, causing the latter to tilt in the counter-clockwise sense, thereby dragging cam follower 136 down the camming surface 130 and thus retracting catch 96. At this stage, hoisting can proceed, as catch 96, having been retracted, is no longer intercepted by opening 72.

Figure 19:
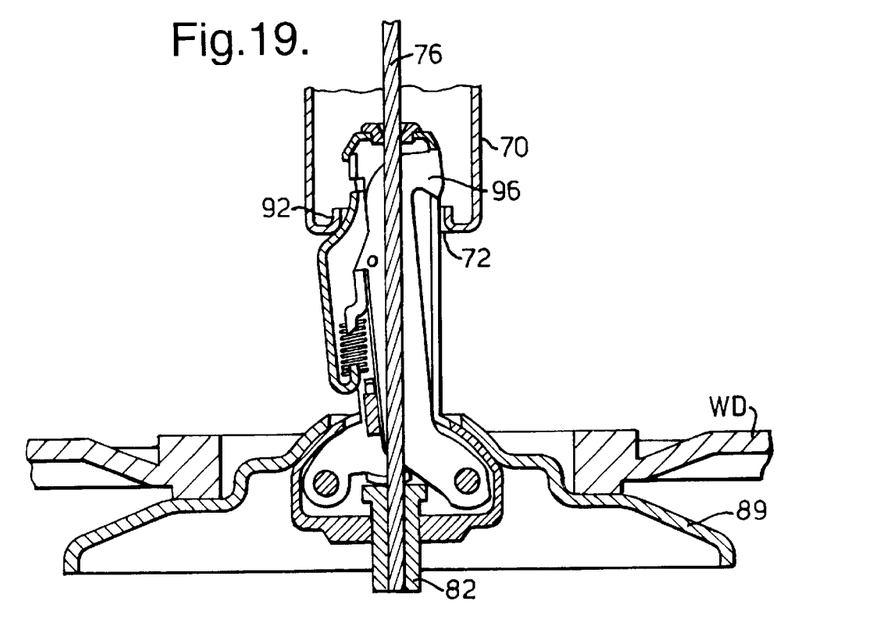
FIG. 19 illustrates the continued hoisting process after the position depicted in FIG. 9.

In FIG. 19, the upper end of the device has entered bracket 70, with the retracted catch already beyond rim 74. At this instant, camming surface 92 hits the edge of opening 72 and, with hoisting continuing, is pushed to the right, with the result that catch 96 returns to its projecting limit position.

Figure 20:
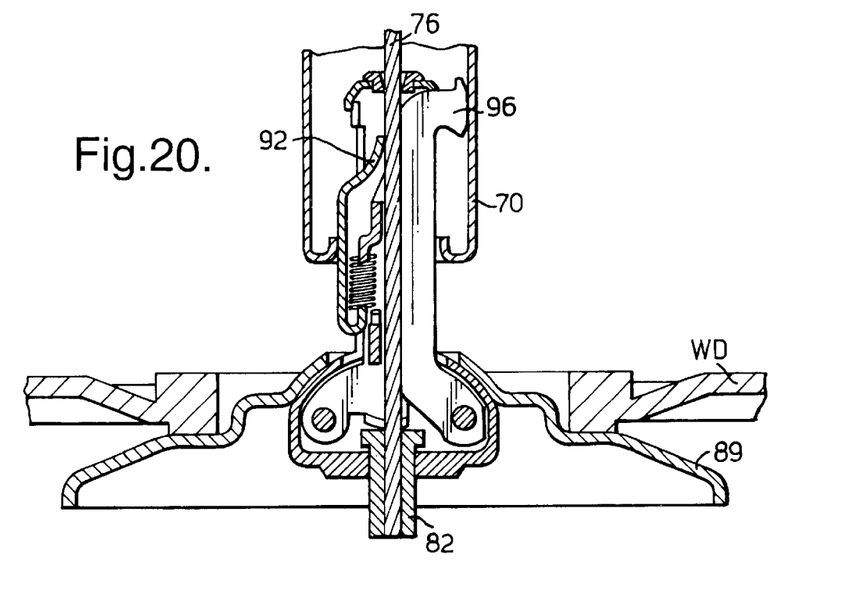
FIG. 20 represents the situation after completion of the hoisting process.
Figure 21:
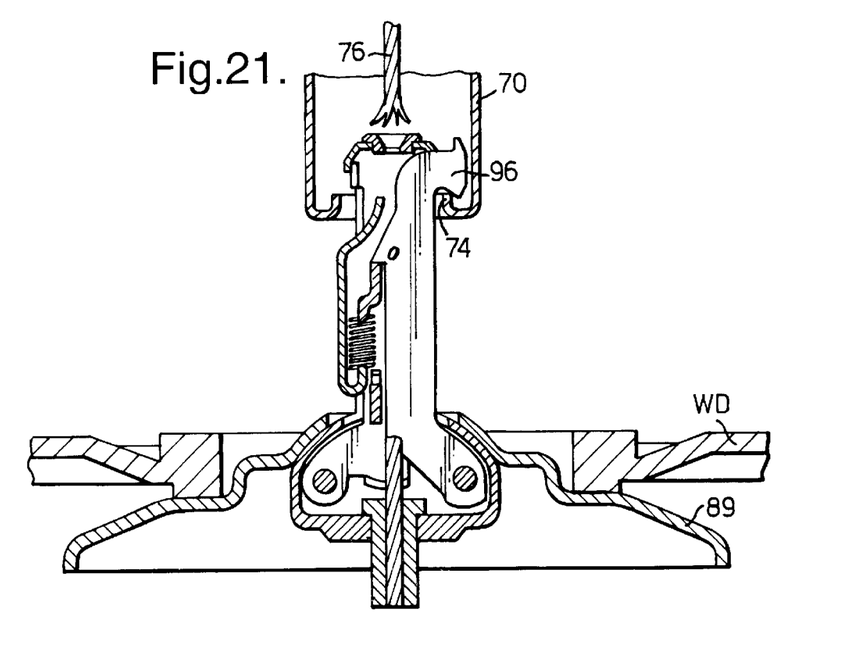
FIG. 21 depicts the situation following a cable failure.

In FIG. 20, hoisting has been completed, camming surface 92 is inside housing 78 and catch 96 fully projects. In case of cable failure as represented in FIG. 21, the loaded device drops for a short length until catch 96 is intercepted by rim 74, which of course breaks the fall.

Figure 22:
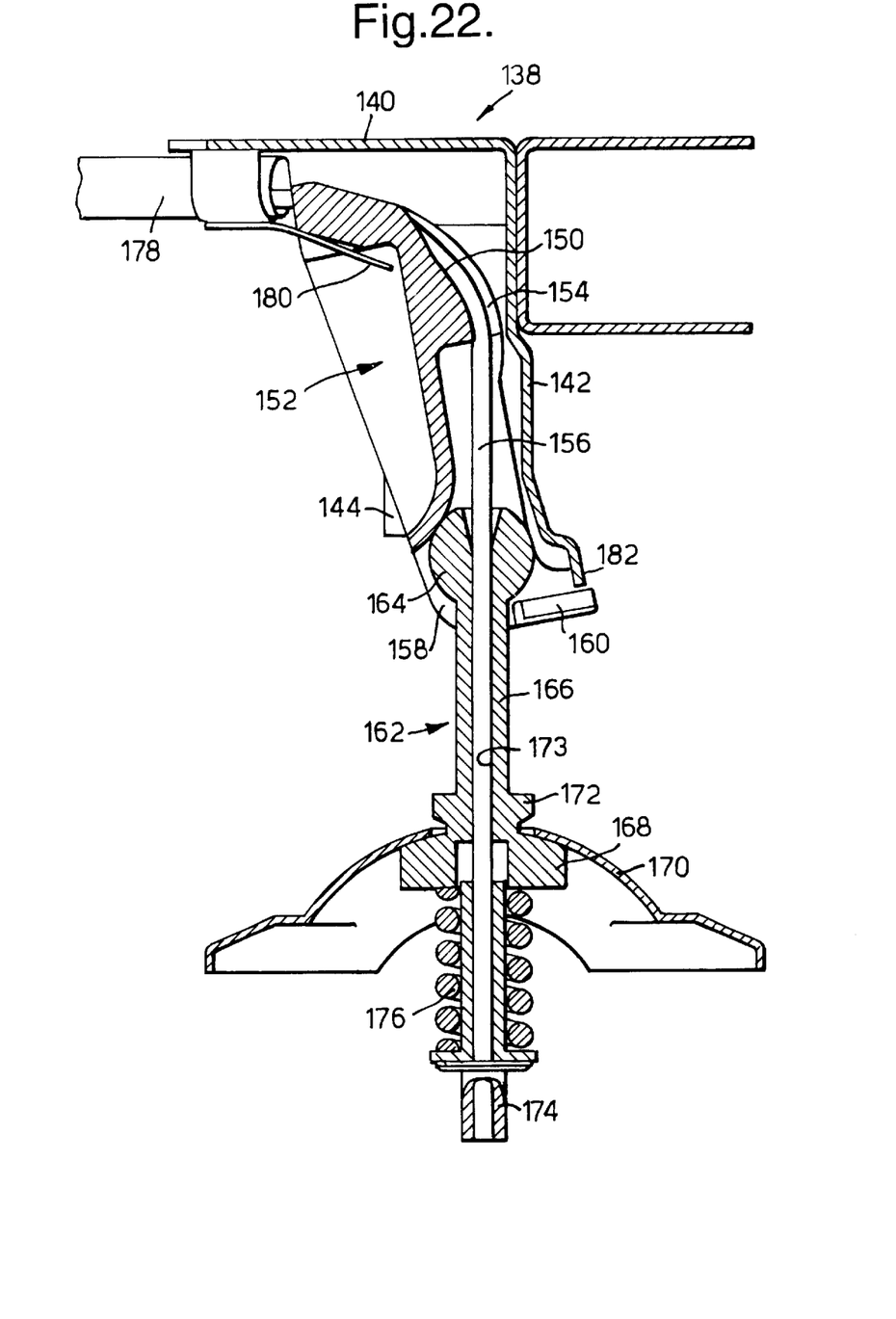
FIG. 22 is a cross-sectional view of another embodiment of the device according to the invention in a first operational stage.
Figure 23:
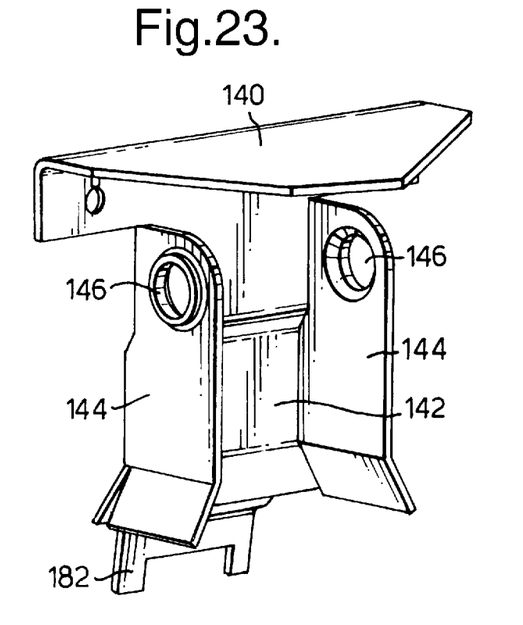
FIG. 23 is a perspective view of the bracket of FIG. 22.
Figure 24:
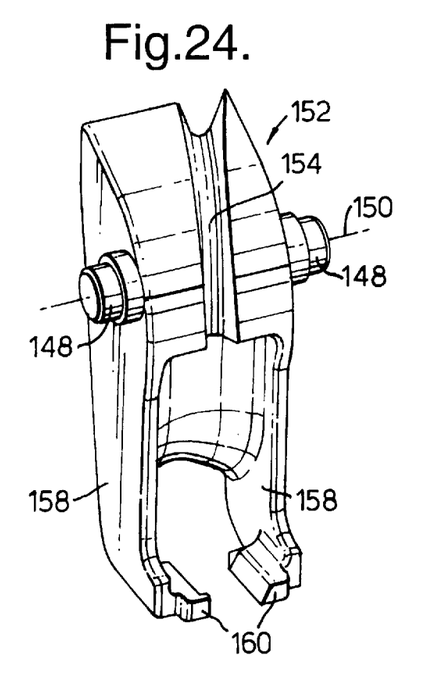
FIG. 24 is a perspective view of the lever of FIG. 22.
Figure 25:
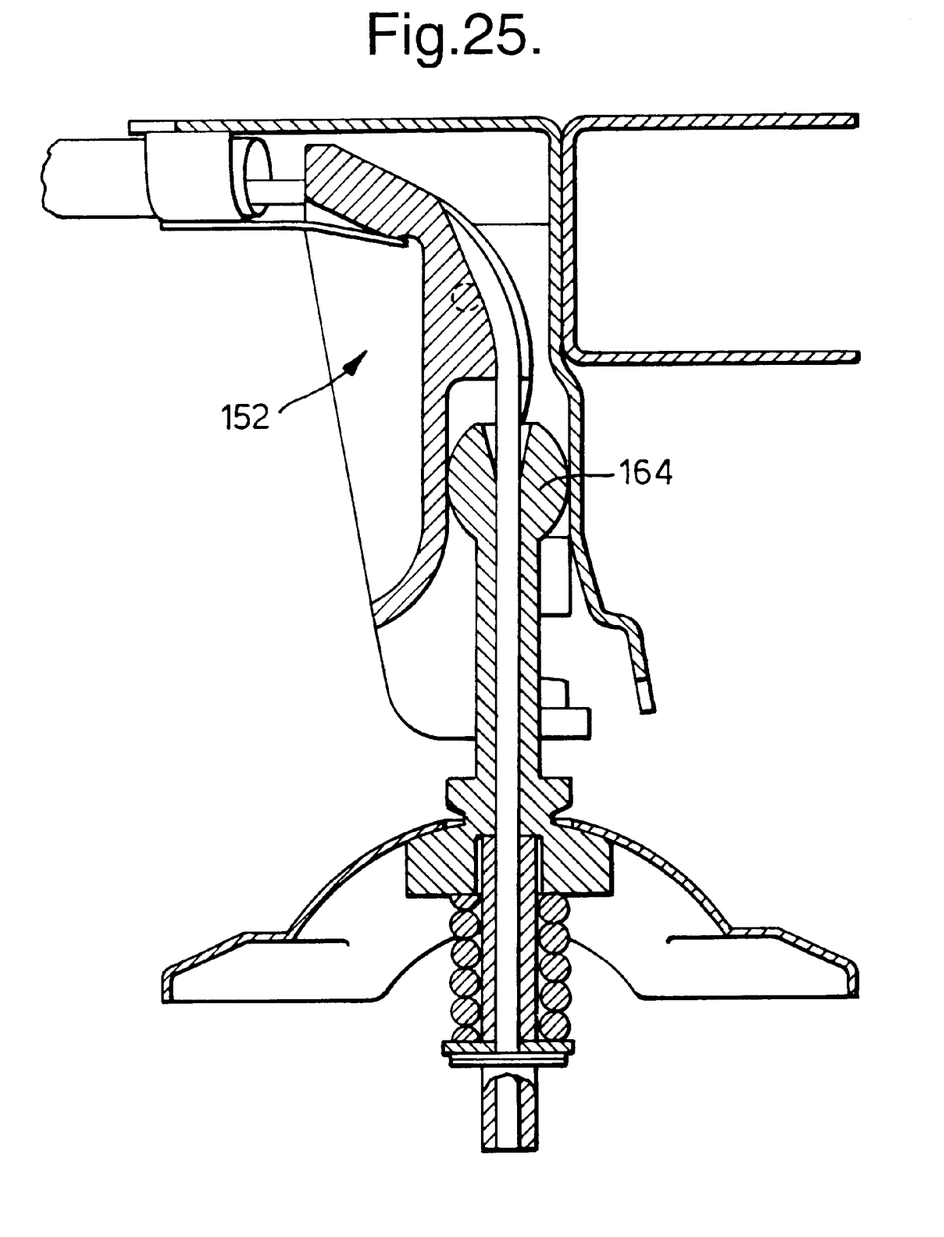
FIG. 25 represents a second stage of operation of the embodiment of FIG. 22.

A third embodiment of the device according to the invention is described in FIGS. 22–26. There is seen in FIG. 22 a bracket 138, shown to better effect in FIG. 23, having a top member 140, a rear wall 142 and two lateral walls 144. Bracket 138, advantageously press-formed from a single blank of sheet steel, is fixedly attached to a member of the vehicle's chassis. As can be seen in FIG. 23, each of the wing-like lateral walls 144 is provided with bearing means 146 for journals 148, seen in FIG. 24. In the cross-sectional view of FIG. 22, only the axes 150 of journals 148 are marked. Journals 148 are advantageously integral parts of an injection-molded plastic lever 152 (see also FIG. 24), in the upper part of which is provided a groove 154 for cable 156 to run along. The lower part of lever 152 is in the form of two arms 158, provided at their ends with gripping projections 160. Further seen in FIG. 22 is a plunger 162 having an olive-shaped head 164, a relatively slender stem 166 and a relatively broad shoulder 168 with a substantially spherical surface on which a wheel-disk retainer 170 is freely seated, the freedom of movement of which is limited by a collar 172. Cable 156 passes plunger 162 via a bore 173.

The end of cable 156 is fixedly connected to a ferrule 174, with a helical compression spring 176 serving as shock absorber and for compensation for possible changes in tire width. Further shown is a cable guide tube 178 and a flat spring 180 which exerts a clockwise moment on lever 152.

In the operational stage shown, i.e., upon the spare tire being raised, tension in cable 156 exerts a counter-clockwise moment on lever 152, overcoming the clockwise moment produced by spring 180 and tilting lever 152 into a first limit position, shown in FIG. 22, with the tilt being stopped by the end 182 of rear wall 142 of bracket 138. In this position of lever 152, head 164 of plunger 162 can enter the space defined by lever 152 and rear wall 142 from behind, gripping projections 160. In doing so (FIG. 25), plunger head 164 forces lever 152 to tilt in a clockwise direction towards a second limit position in which the spare tire is fully raised and abuts against the aforementioned structural components of the vehicle chassis.

Figure 26:
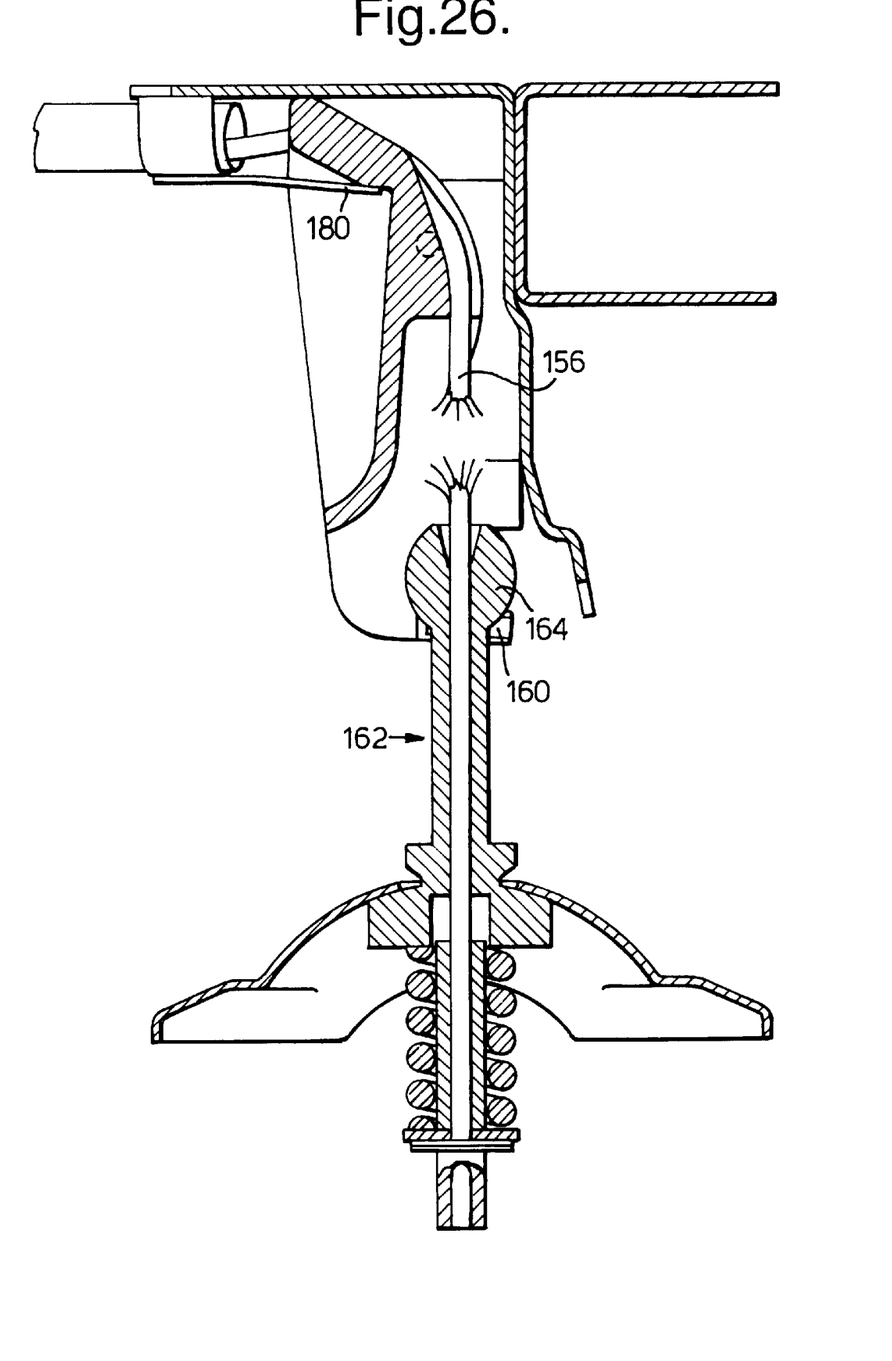
FIG. 26 illustrates the situation in the device of FIG. 22 following a cable failure.

A situation of cable failure or break is illustrated in FIG. 26. Cable 156 having broken, cable tension has dropped to zero and the counter-clockwise moment produced by this tension has been eliminated, permitting spring 180 to tilt lever 152 filly into the second limit position, in which gripping projections 160 are substantially vertically below plunger head 164. Head 164, having lost its support, drops and is intercepted and retained by gripping projections 160.

Although springs 26 and 176 are configured as helical compression springs, an appropriate modification of the harnessing of these springs could also permit the use of tension springs.

While the present invention was exemplified by means of its application to spare tires, it should be clear that the mechanical and structural concepts involved can also be applied to other types of liftable and lowerable loads.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A device for securing the upper terminal position of a liftable and lowerable object, comprising:

cable means having a hoist-side end and an object-side end;

a stationary bracket having an aperture disposed in a substantially horizontal plane;

a housing supported by said object-side end of said cable means and carrying said object, said housing having a lower portion and an upper portion, at least the upper portion being configured to pass through said aperture, a first opening at the top of the upper portion and a second opening at the bottom of the lower portion facilitating the passage of said cable means through said housing, and two oppositely located, elongated slots extending along at least parts of said upper portion;

lever means located inside, and extending through a substantial portion of, said housing, said lever means being pivotably mounted in the lower portion of said housing and being provided with catch means and camming means, said lever means having a first limit position in which said camming means protrudes through one of said elongated slots, and a second limit position in which said catch means protrudes through the other one of said elongated slots, and spring means adapted to act on said lever means and biasing said lever means towards said second limit position.

2. The device as claimed in claim 1, wherein said object to be lowered or lifted is a spare tire of a road vehicle.

3. The device as claimed in claim 2, wherein said bracket is fixedly attachable to a member of the chassis of said vehicle.

4. The device as claimed in claim 1, further comprising a wheel retainer riding on an upper surface of said lower housing portion and configured to be slipped underneath, and to support, said object to be lowered or lifted.

5. The device as claimed in claim 1, wherein said lever means is provided with a projection configured and located in such a way that in said first limit position said cable means can pass adjacent to said projection along a straight line from said first opening in said housing to the second opening therein, and in the second limit position, said cable means is deflected from said straight line by said projection.

6. The device as claimed in claim 1, wherein said lever means is provided with at least two camming means.

7. The device as claimed in claim 6, further comprising a cam follower mounted on said catch means carrying lever means and interacting with at least one of said at least two camming means.

8. The device as claimed in claim 1, further comprising one or more second spring means abutting with their lower ends against members of said stationary bracket and with their upper ends against a cross member of said bracket, which cross member has one degree of freedom in translation relative to said bracket.

9. The device as claimed in claim 8, wherein said second spring means are helical compression springs adapted to be compressed by a translational movement of said cross member.

10. The device as claimed in claim 1, wherein said lever means is a nested twin-lever, one half of which carries said catch means and the other half carries said camming means.

11. The device as claimed in claim 1, further comprising a guide tube for said cable means, one end of which guide tube is located at least in proximity to said cross member, wherein increased tension in said cable means causes said guide tube to flex and said one end to apply pressure to said cross member, resulting in said spring means becoming compressed.

* * * * *